United States Patent [19]
Dey et al.

[11] 3,947,289
[45] Mar. 30, 1976

[54] MIXED SOLVENTS FOR HIGH AND LOW TEMPERATURE ORGANIC ELECTROLYTE BATTERIES

[75] Inventors: Arabinda Dey, Needham; Bernard P. Sullivan, Arlington, both of Mass.

[73] Assignee: P. R. Mallory & Co., Inc., Indianapolis, Ind.

[22] Filed: Nov. 23, 1973

[21] Appl. No.: 418,526

[52] U.S. Cl. ............... 136/6 LN; 136/154; 136/155
[51] Int. Cl.[2] ....................................... H01M 10/00
[58] Field of Search ................. 136/154, 155, 6 LN

[56] References Cited
UNITED STATES PATENTS

| | | | |
|---|---|---|---|
| 3,468,716 | 9/1969 | Eisenberg | 136/155 X |
| 3,493,433 | 2/1970 | Hoffman | 136/155 X |
| 3,511,716 | 5/1970 | Gabano et al. | 136/155 X |
| 3,542,602 | 11/1970 | Gabano et al. | 136/155 |
| 3,567,515 | 3/1971 | Maricle | 136/6 LN |
| 3,658,592 | 4/1972 | Dey | 136/6 LN |
| 3,681,143 | 8/1972 | Dey | 136/154 X |
| 3,681,144 | 8/1972 | Dey | 136/154 X |
| 3,769,092 | 10/1973 | Dechenaux | 136/155 X |
| 3,796,604 | 3/1974 | Gabano et al. | 136/155 X |
| 3,796,605 | 3/1974 | Gabano et al. | 136/155 X |

Primary Examiner—L. Dewayne Rutledge
Assistant Examiner—John F. Niebling
Attorney, Agent, or Firm—Israel Nissenbaum; Ronald Cornell; Charles Hoffmann

[57] ABSTRACT

An organic electrolyte system suitable for use at low and ambient temperatures with active metals is described comprising binary or ternary solvent mixtures having tetrahydrofuran or N-nitrosodimethylamine or mixtures thereof as one component and propylene carbonate; gamma-butyrolactone; 1,3-dioxolane; dimethyoxy ethane; bis-2-ethoxyethyl ether; bis-(2-methoxy) ethoxyethyl ether as the other components with active metal salts as the solute. Electrochemical cells with this electrolyte are also described.

9 Claims, 2 Drawing Figures

MIXED SOLVENTS FOR HIGH AND LOW TEMPERATURE ORGANIC ELECTROLYTE BATTERIES

FIELD OF THE INVENTION

This invention relates to non-aqueous electrolyte systems for electrochemical cells based upon organic solvents and more particularly relates to such electrolyte systems having good conductivity at low temperatures and low vapor pressures at high temperatures.

BACKGROUND OF THE INVENTION

With the advent of organic electrolytes it is possible to use lithium and similar active metals as anodes in electrochemical systems. The use of such active metal electrodes i.e. those metals are considered active which will liberate hydrogen from water. It is possible to achieve high initial voltages from the anode part of the couple. The lithium/metal oxide systems were found to perform well in the organic electrolytes, particularly those consisting of solutions of lithium perchlorate ($LiClO_4$) in tetrahydrofuran (THF). However, the systems exhibited several defects. The electrolyte solvent systems presented the problem of excessive pressure build-up at temperatures above room temperature due to the high vapor pressure of the commonly used solvents and particularly of tetrahydrofuran. A further problem was the low conductivity of such solvent systems at low temperatures due to the decreased solubility of the lithium perchlorate ($LiClO_4$) in tetrahydrofuran (THF) and in the other commonly used non-aqueous, organic electrolyte solvent systems.

THE INVENTION

An object of the present invention is to provide organic electrolyte systems with adequate electrical conductivity at temperatures below room temperature.

It is a further object of this invention to provide the organic electrolytes with vapor pressures lower than the vapor pressure of 1M $LiClO_4$ in tetrahydrofuran (THF) at temperatures above room temperature.

It is another object of this invention to provide organic electrolytes in which the Li/metal oxide electrochemical systems perform adequately both at high and low temperatures.

It is still another object of this invention to provide a high energy/density organic electrolyte electrochemical cell system.

The above and further objects are achieved by the present invention which is based on an electrolyte for use in active metal, high-potential, electrochemical cells and which comprises an active metal salt dissolved in a non-aqueous solvent system comprising (a) at least 10 volume percent of tetrahydrofuran (THF) or N-Nitrosodimethylamine (NDA) or mixtures thereof; and (b) propylene carbonate (PC); gamma-butyrolactone (BL); 1,3 dioxolane (DL); dimethoxyethane (DME); Bis-2 ethoxyethyl ether (EEE) or Bis (2-methoxy) ethoxyethyl ether (MEEE) and mixtures thereof.

The above solvent systems in suitable binary or ternary mixtures result in electrolyte solutions, particularly with lithium perchlorate in amounts ranging from 0.25 molar to 2 molar, with good conductivities at low temperatures and provided lower vapor pressures at high temperatures.

DETAILED DESCRIPTION

Figure 1:
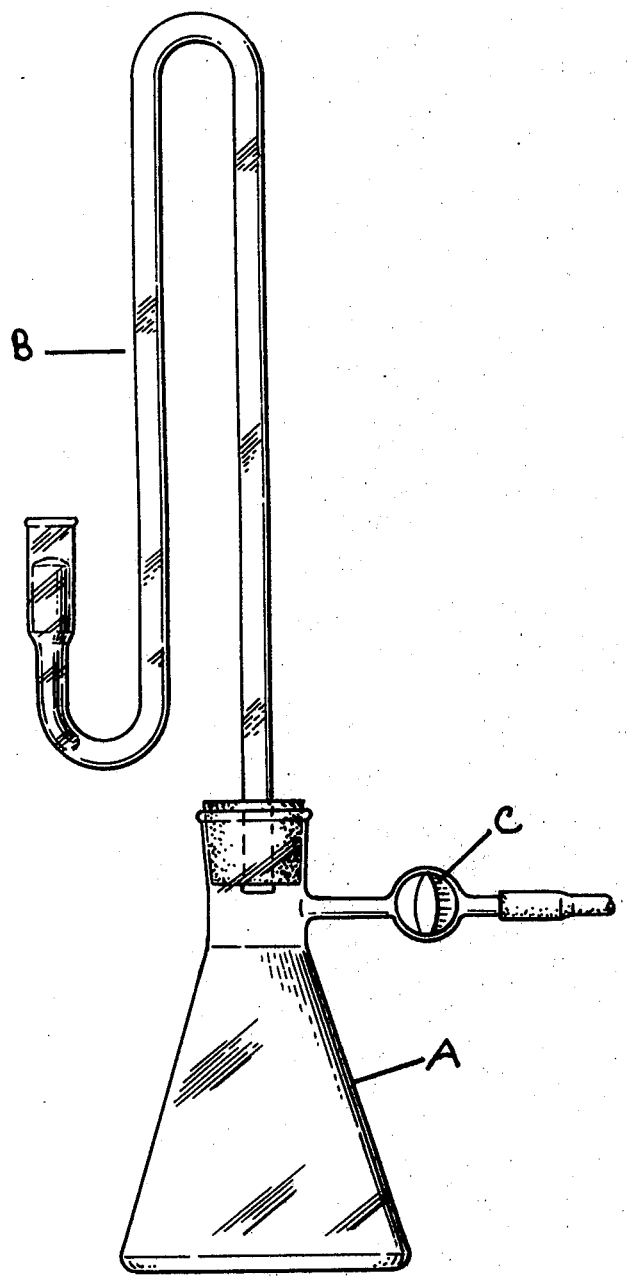

While lithium perchlorate is listed as the preferred electrolyte for use according to this invention, it has generally been found that suitable inorganic salts of lithium or other of the active metals as the cations and with various anions such as the halides, the chlorates, the perchlorates, the tetrachloro-aluminates, the tetrafluroborates, the hexoflorophosphates and the hexofluoroarsenates.

Such salts should be dissolved in the organic solvent systems of this invention in an amount ranging between 0.25 molar and 2 molar. Lower concentrations of these salts in the solvent system do not provide adequate conductivity. Higher concentrations of the salts in the solvent system are difficult to achieve and provide no additional conductivity. Further it has been found that such salts tend to precipitate out at lower temperatures.

Generally, the concentration of the electrolyte salt in the solvent system is adjusted so that it will remain entirely soluble at the lowest temperature of intended use.

Occasionally it has been found that for certain uses it is advantageous with certain depolarizers to saturate the electrolyte with sulfur dioxide. This is described in co-pending patent application Ser. No. 299,557 filed Oct. 20, 1972. By saturating the electrolyte according to this invention with sulfur dioxide advantages in long term storage and discharge characteristics are achieved.

In general we have found that when the solvent mixtures form a binary system i.e. having two components, one component should be either tetrahydrofuran (THF) or N-Nitrosodimethylamine (NDA) in a minimum concentration of 10 volume percent and a preferred concentration of 50 volume percent. As the second component can be chosen any of the following solvents: propylene carbonate (PC), gamma-butyrolactone (BL), dioxolane (DL), dimethoxyethane (DME), Bis (2-ethoxy) ethyl ether (EEE), or Bis (2-methoxy) ethoxy ethyl ether (MEEE).

In the case of ternary mixtures one component should be tetrahydrofuran (THF) or N-Nitrosodimethylamine (NDA) with a minimum concentration of 10 percent and a preferred concentration of 50 percent. The other two components of the ternary system can be selected from the other of the above components and any of the solvents from the second components of the binary mixture. Generally, the other two components can be selected from such binary solvent mixtures as propylene carbonate (PC) and dioxolane (DL), propylene carbonate (PC) and gamma-butyrolactone (BL), N-Nitrosodimethylamine (NDA) and propylene carbonate (PC), dioxolane (DL) and Bis (2-methoxy) ethoxy ethyl ether (MEEE). Generally, in such ternary mixtures the binary solvent system should have its components present in equal proportions.

The preferred binary compositions are propylene carbonate (PC) and tetrahydrofuran (THF), gamma-butyrolactone (BL) and tetrahydrofuran (THF), tetrahydrofuran (THF) and dioxolane (DL), tetrahydrofuran (THF) and dimethoxyethane (DME).

The preferred ternary compositions are tetrahydrofuran (THF) and dioxolane (DL) and Bis (2-methoxy) ethoxy ethyl ether (MEEE), tetrahydrofuran (THF) and dioxolane (DL) and propylene carbonate (PC), tetrahydrofuran (THF) and gamma-butyrolactone (BL) and propylene carbonate (PC), tetrahydrofuran (THF) and gammabutyrolactone (BL) and Bis (2-methoxy) ethoxy ethyl ether (MEEE), tetrahydrofuran (THF) and N-Nitrosodimethylamine (NDA) and propylene carbonate (PC).

Certain of the solvents mentioned above have a tendency to polymerize. Such polymerization particularly with tetrahydrofuran (THF) may cause an increased cell impedance. Therefore the addition of polymerization inhibitors such as butylated hydroxy toluene (BHT), pyridine, LiBr and LiCNS in small concentrations (less than 5 weight percent) are beneficial to the storage characteristics of the cells. Generally, they should be used in amounts of less than 5 weight percent, and preferably between 0.1 weight percent to 0.25 weight percent of the binary or ternary solvent mixture.

The organic electrolyte systems according to this invention provide excellent electrolytes with electrochemical couples based upon lithium, potassium, sodium, calcium, magnesium, rubidium, beryllium, and aluminum as the anodes and upon various oxidizing depolarizing systems. In addition to the metal oxide depolarizing systems the various halogens can also be used. In general the halogens being gaseous are preferably used in the form of semifuel cells wherein the depolarizer elements in the form of the gaseous halogens or other gaseous depolarizers are introduced into the cells through a Teflonized membrane in a manner well known to this art. Generally, the suitable gaseous depolarizers for such semi-fuel cells are soluble in the electrolyte of this invention. Included among such depolarizers are chlorine, fluorine, sulfur dioxide, sulfur trioxide and the nitrogen oxides.

Basically, the invention is based upon a combination of chemically compatible solvents which fall into the three following classes: solvents having low vapor pressures, solvents in which the solubility of the electrolyte salts i.e. lithium perchlorate is substantial at low temperatures. Among such solvents are PC and DL and solvents which contribute toward the efficient discharge of the depolarizers used in the electrochemical cells eg. THF, DMS, NDA, BL.

The mixed solvents in the electrolytes according to this invention provide for considerable improvement in room temperature performance of the active metal electrochemical cells and batteries.

The invention will be described more throughly in the following examples which set forth preferred solvent systems in preferred proportions. However it is to be understood that these are merely for purposes of example and that the invention is not to be limited to such components or proportions.

EXAMPLE 1

The electrical conductivities of the various organic electrolytes consisting of 1M $LiClO_4$ solution in the various solvents and the solvent mixtures were measured using an AC bridge (at 1000 cycles/sec). The results are given in Table 1.

TABLE 1

Electrical Conductivities of 1M $LiClO_4$ Solutions In Various Solvents and Mixed Solvents

| Solvents and Mixed Solvents (vol percent) | Specific Conductivities in $ohm^{-1}cm^{-1}$ | | |
|---|---|---|---|
| | at Room Temp. | $-15°C$ | $-30°C$ |
| Tetrahydrofuran (THF) | $3.2 \times 10^{-3}$ | $10^{-6}$ | — |
| Propylene Carbonate (PC) | $4.6 \times 10^{-3}$ | $1.5 \times 10^{-3}$ | $4.4 \times 10^{-4}$ |
| gamma-Butyrolactone (BL) | $9.7 \times 10^{-3}$ | $4.6 \times 10^{-3}$ | $3.0 \times 10^{-3}$ |
| N-Nitrosodimethylamine (NDA) | — | — | $6.4 \times 10^{-3}$ |
| Bis-2 Ethoxyethyl ether (EEE) | $1.7 \times 10^{-3}$ | $6.8 \times 10^{-4}$ | — |
| Dimethyl Sulfoxide (DMSO) | $1.1 \times 10^{-2}$ | — | solidified |
| 75% THF + 25% PC | $8.7 \times 10^{-3}$ | $5.6 \times 10^{-3}$ | — |
| 50% THF + 50% PC | $9.6 \times 10^{-3}$ | $4.6 \times 10^{-3}$ | — |
| 25% THF + 75% PC | $7.7 \times 10^{-3}$ | $2.9 \times 10^{-3}$ | — |
| 75% THF + 25% BL | $9.0 \times 10^{-3}$ | $6.0 \times 10^{-3}$ | — |
| 50% THF + 50% BL | $1.1 \times 10^{-2}$ | $6.6 \times 10^{-3}$ | — |
| 25% THF + 75% BL | $1.1 \times 10^{-2}$ | $5.9 \times 10^{-3}$ | — |
| 75% THF + 25% EEE | $2.7 \times 10^{-3}$ | $1.7 \times 10^{-3}$ | — |
| 50% THF + 50% EEE | $2.3 \times 10^{-3}$ | $1.7 \times 10^{-3}$ | — |
| 25% THF + 75% EEE | $1.8 \times 10^{-3}$ | $9.5 \times 10^{-4}$ | — |
| 50% THF + 50% DMSO | $1.3 \times 10^{-2}$ | — | $4.5 \times 10^{-3}$ |
| 75% NDA + 25% PC | — | — | $4.0 \times 10^{-3}$ |
| 50% NDA + 50% PC | — | — | $1.8 \times 10^{-3}$ |
| 25% NDA + 75% PC | — | — | $1.1 \times 10^{-3}$ |
| 75% NDA + 25% THF | — | — | $6.4 \times 10^{-3}$ |
| 50% THF + 25% 1,3 Dioxolane (DL) +25% BIS (2-methoxy) ethoxy ethyl ether (MEEE) | $5.9 \times 10^{-3}$ | $4.1 \times 10^{-3}$ | $3.2 \times 10^{-3}$ |
| 50% THF + 25% DL + 25% PC | $1.0 \times 10^{-2}$ | $6.6 \times 10^{-3}$ | $4.8 \times 10^{-3}$ |
| 50% THF + 25% BL + 25% MEEE | $9.2 \times 10^{-3}$ | $4.6 \times 10^{-3}$ | $3.2 \times 10^{-3}$ |
| 50% THF + 25% BL + 25% PC | $1.1 \times 10^{-2}$ | $6.3 \times 10^{-3}$ | $4.2 \times 10^{-3}$ |
| 50% PC + 25% NDA + 25% THF | — | — | $2.9 \times 10^{-3}$ |
| 50% NDA + 25% PC + 25% THF | — | — | $4.9 \times 10^{-3}$ |

The data in Table 1 indicated a substantial improvement in the electrical conductivity of the organic electrolytes at low temperature using mixed solvents.

EXAMPLE 2

The vapor pressures of the various organic electrolytes were measured using an apparatus shown in FIG. 1. The organic electrolyte was introduced in the conical flask A. The flask was then subjected to the liquid nitrogen temperature in order to solidify the electrolyte so that it had negligible vapor pressure. The flask was then evacuated and the mercury column height in the capillary tube B was then noted. The stop cock C was then closed and the flask was kept in a bath (not shown) fitted with a thermostat set at the desired temperature (50°C) at which the vapor pressure measurement was to be made. The mercury height in the capillary tube B was noted after the equilibration. The difference in the heights of the mercury columns provides a measure of the vapor pressures of the electrolytes at 50°C. The results are given in Table 2.

TABLE 2

The Vapor Pressures of 1M LiClO₄ Solutions in the Various Solvents And The Solvent Mixtures at 50°C

| Solvents and Solvent Mixtures (vol. percent) | Vapor Pressure at 50°C in mm of Hg | % Vapor Pressure Reduction From that of 1M LiClO₄-THF at 50°C |
|---|---|---|
| THF | 431 | |
| 50% THF + 50% MEEE | 330 | 23% |
| 50% THF + 50% EEE | 223 | 48% |
| 50% THF + 50% DL | 324 | 25% |
| 50% THF + 50% PC | 245 | 43% |
| 50% THF + 50% BL | 267 | 38% |
| 50% THF + 50% Dioxane (DO) | 245 | 43% |
| 50% THF + 50% Dimethoxyethane (DME) | 330 | 23% |
| 50% THF + 25% DL + 25% MEEE | 329 | 24% |
| 50% THF + 25% DL + 25% PC | 294 | 32% |
| 50% THF + 25% BL + 25% MEEE | 286 | 34% |
| 50% THF + 25% BL + 25% PC | 251 | 42% |
| 50% THF + 10% DL + 40% MEEE | 319 | 26% |
| 50% THF + 15% DL + 35% MEEE | 340 | 21% |
| 30% THF + 20% DL + 50% MEEE | 309 | 28% |
| 10% THF + 40% DL + 50% MEEE | 258 | 40% |

The results in Table 2 indicated a substantial reduction of the vapor pressures of the electrolytes using mixed solvents.

EXAMPLE 3

Figure 2:
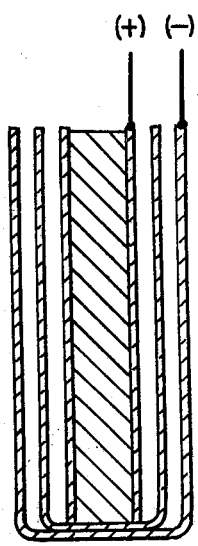

Li/V₂O₅ cells were constructed in parallel plate configuration as shown in FIG. 2. The lithium anode was prepared by pressing the lithium ribbon on the stainless steel exmet. The V₂O₅ cathode was constructed by pressure molding a rubberized mixture of 70% V₂O₅ + 30% graphite with 5% colloidal Teflon (binder) on the nickel exmet. The cathode was then cured at 300°C for one-half hour. The cathode dimensions were: 0.91 × 0.38 × 0.05 inch. The filter paper separator was used. The cells were placed in the polyethylene capped glass bottles and were discharged in the electrolytes consisting of 1M LiClO₄ solutions in the various solvents and the mixed solvents. The results are given in Table 3.

TABLE 3

Discharge Characteristics of Li/V₂O₅ Cells in the Electrolytes Consisting of 1M LiClO₄ Solutions in the Various Solvents And The Mixed Solvents

| Solvents and Mixed Solvents (vol.%) | Discharge Efficiency up to 1.5 Volt of V₂O₅ Cathodes (based on 4 equivalent/mole) at (C.D=1 ma/cm²) | | |
|---|---|---|---|
| | Room Temp. | −15°C | −30°C |
| THF | 55% | 0 | 0 |
| PC | 13% | — | — |
| BL | 36% | — | — |
| DL | 21% | — | — |
| 50% THF + 50% PC | 54% | 13% | 7.5% |
| 50% THF + 50% DL | 48% | 27% | 26% |
| 50% THF + 50% DME | 59% | 2% | 0.1% |
| 50% THF + 50% DO | 59% | 0 | 0 |
| 50% THF + 50% MEEE | 55% | — | — |
| 50% THF + 50% EEE | 45% | 0 | 0 |
| 50% THF + 25% DL + 25% MEEE | 62% | — | — |
| 50% THF + 25% DL + 25% PC | 53% | — | — |
| 50% THF + 25% BL + 25% MEEE | 45% | — | — |
| 50% THF + 25% BL + 25% PC | 56% | — | — |
| 50% THF + 10% DL + 40% MEEE | 53% | — | — |
| 50% THF + 15% DL + 35% MEEE | 54% | — | — |
| 40% THF + 10% DL + 50% MEEE | 50% | — | — |
| 40% THF + 25% DL + 35% MEEE | 50% | — | — |
| 30% THF + 20% DL + 50% MEEE | 55% | — | — |
| 25% THF + 25% DL + 50% MEEE | 49% | — | — |
| 10% THF + 25% DL + 65% MEEE | 36% | — | — |
| 10% THF + 40% DL + 50% MEEE | 53% | — | — |

The results in Table 3 indicated that the performance of the Li/V₂O₅ cell at room temperature was considerably improved in the mixed solvents compared to that in the single solvents except in the case of THF. The low temperature performance of the cell in certain mixed solvents is found to be substantially superior to that in pure THF.

What is claimed is:

1. An electrolyte for use in active metal high potential electrochemical cells comprising an active metal salt dissolved in a non-aqueous solvent system comprising (a) at least 10 volume percent of tetrahydrofuran or N-nitrosodimethylamine or mixtures thereof; and (b) propylene carbonate, gamma-butyrolactone, 1,3-dioxolane, dimethoxyethane, bis (2-ethoxy) ethyl ether, bis (2-methoxy) ethoxy-ethyl ether and mixtures thereof.

2. The electrolyte according to claim 1, wherein said solvent system includes up to 5 weight percent of a polymerization inhibitor.

3. The electrolyte according to claim 1, wherein said salt is selected from among salts of active metals, selected from the group consisting of lithium, sodium, potassium, beryllium, calcium, magnesium and aluminum with the haloacids, chlorates, perchlorates, tetrachloroaluminates, tetrafluoroborates, hexaflorophosphates, hexafluoroarsenates.

4. The electrolyte according to claim 1, wherein said solution of said active metal salts in said solvent is additionally saturated with sulfur dioxide.

5. The electrolyte according to claim 3, wherein said salt is present in a concentration in excess of 0.2 molar.

6. The electrolyte according to claim 1, wherein said solvent system is a binary solvent system essentially consisting of about 50 volume percent of a solvent selected from the group consisting of tetrahydrofuran and N-nitrosodimethylamine and the balance selected from the group of the individual solvents of (b).

7. The electrolyte according to claim 1, wherein said solvent system is a ternary solvent system consisting essentially of about 10 to about 50 volume percent of either tetrahydrofuran or N-nitrosodimethylamine, the remainder of the ternary system consisting of two components selected from the group of propylene carbonate, gamma-butyrolactone, 1,3-dioxolane, dimethoxyethane, bis (2-ethoxy) ethyl ether, and bis (2-methoxy) ethoxy-ethyl ether.

8. The electrolyte according to claim 1, wherein said solvent system is a ternary solvent system consisting essentially of about 10 to about 50 volume percent of tetrahydrofuran and N-nitrosodimethylamine, the remainder of the ternary system consisting of a component selected from the group of propylene carbonate, gamma-butyrolactone, 1,3-dioxolane, dimethoxyethane, bis (2-ethoxy) ethyl ether, and bis (2-methoxy) ethoxy-ethyl ether.

9. An electrochemical cell system for utilizing the electrolyte according to claim 1, wherein said electrode system is selected from the group consisting of $Li/V_2O_5$; $Li/MoO_3$; $Li/Ag_2CrO_4$; $Li/HgCrO_4$; $Li/CuCrO_4$; $Li/MnO_2$; $Li/HgO$; $Li/PbO_2$; $Li/Ag_2O_2$; $Li/CuO$; and semi-fuel cells having lithium anodes and fuels selected from electrolyte soluble gaseous depolarizers from the group consisting of halogen, sulfur oxides, nitrogen oxides and hydrogen sulfide.

* * * * *